United States Patent Office 3,479,340
Patented Nov. 18, 1969

3,479,340
PROCESS FOR THE PREPARATION OF STEROIDAL 1,4-DIENES UNSUBSTITUTED IN THE 3-POSITION
Richard W. Rees, St. Davids, Theodore J. Foell, King of Prussia, and Herchel Smith, Wayne, Pa., assignors to American Home Products Corporation, New York, N.Y., a corporation of Delaware
No Drawing. Filed Aug. 1, 1967, Ser. No. 657,507
Int. Cl. C07c *167/00, 173/00;* A61k *27/00*
U.S. Cl. 260—239.55        10 Claims

ABSTRACT OF THE DISCLOSURE

Novel steroidal 1,4-dienes unsubstituted in the 3-position (I), which are hormonally-active, are prepared by a new process comprising selectively with alkali metals or alkaline earth metals in excess in a liquid amine a 3-di-(lower)alkylmercaptole of a 1,4-diene steroid (II) until conversion of the 3-di(lower)alkylmercaptole group to a 3-methylene group is substantially complete.

---

This invention relates to the preparation of new 1,4-diene steroids having an unsubstituted 3-postion. The steroids produced in accordance with this invention show steroid hormonal activity in animals as shown by standard test procedures and are useful for the preparation of other 1,4-diene steroids having hormonal activity.

The compounds provided by the process of this invention are 1,4-diene steroids having an unsubstituted 3-position of Formula I:

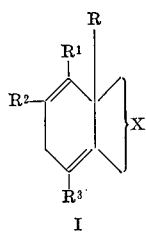

I wherein R is lower alkyl, particularly methyl, $R^1$, $R^2$ and $R^3$ are hydrogen or lower alkyl and X is an organic radical of at least 11 carbon atoms so arranged as to complete a cyclopentanoperhydrophenanthrene nucleus.

By(lower)alkyl in this specification is meant such radical having from 1 to about 5 carbon atoms.

Special mention is made of a class of preferred steroids of this invention: these are steroidal 1,4-diene compounds of Formula I wherein R is methyl, $R^1$ and $R^3$ are hydrogen, $R^2$ is hydrogen or methyl and X is substituted with hydrogen, hydroxy, alkanolyloxy, keto, carbalkoxy, cyano, alkyl, alkenyl, alkynyl, haloalkynyl, methylene, ethylidene, lactone, ether, ketal, spiroketal, halogen or unsaturated linkages. The terms "alkyl," alkenyl," "alkynyl," and "haloalkynyl" include straight and branched chain hydrocarbon groups containing from about one to about five carbon atoms and single, double or triple bonds, as the case may be. Illustrative groups are, for example, methyl, ethyl, n-propyl, n-butyl, t-butyl, n-pentyl, 2-ethylpropyl, and olefinic and acetylenic derivatives thereof. "Alkanoyloxy' and "carbalkoxy" groups include those containing from about 1 to about 18 carbon atoms in straight or branched chain arrangements, illustrative members of which are, for example, acetoxy, n-propionoxy, t-butyroxy, n-dodecanolyloxy, n-octadecanoyloxy, carbomethoxy, carboethoxy, carbo-n-propoxy, carbo-t-butoxy, carbo-n-dodecyloxy, carbo-n-octadecyloxy, and the like. "Halogen" includes fluorine, chlorine, bromine and iodine. "Ketals," "spiroketals" and "lactones" preferably contain, respectively, from about 2 to about 8 carbon atoms; from about 2 to about 8 carbon atoms and from about 2 to about 4 carbon atoms.

The present invention particularly contemplates a class of compounds of Formula I hereinabove wherein the substituted organic radical X includes 11 carbon atoms arranged as follows:

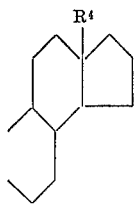

and $R^4$ is hydrogen or lower alkyl. Examples are androsta-1,4-dienes (R and $R^4$ are methyl) and 10-methylgona-1,4-dienes (R is methyl, $R^4$ is hydrogen).

Particularly preferred are those steroids wherein X is a radical of the structure

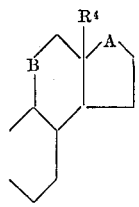

wherein $R^4$ is hydrogen or (lower)alkyl, particularly methyl; A is a divalent linkage selected from ketalized carbonyl,

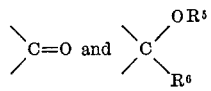

$R^5$ being hydrogen or an acyl radical of an organic carboxylic acid having from 1 to 18 carbon atoms and $R^6$ is hydrogen, (lower)alkyl,(lower)alkenyl,(lower)alkynyl or chloro(lower)alkynyl, especially methyl, ethyl, vinyl, ethynyl or chloroethynyl; and B is a divalent linkage selected from

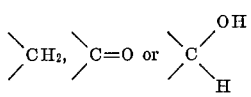

These compounds exhibit progestational, ovulation-inhibiting, anabolic, and androgenic activities.

Examples are androsta-1,4-dienes such as: androsta-1,4-diene - 17 - ol(17 - hydroxyandrosta - 1,4 - diene); androsta - 1,4 - dien-17-one, 17-ethylene ketal; androsta-1,4-dien-17-one; 17α-ethynyl-17β-hydroxyandrosta-1,4-diene; 17α - chloroethynyl - 17β - hydroxyandrosta - 1,4 - diene; 17α-methyl-17β-hydroxyandrosta-1,4-diene; and the like. Special mention is made of 17α-ethynyl-17β-hydroxyandrosta-1,4-diene which has progestational properties.

Also particularly contemplated by the invention is a class of compounds of Formula I hereinabove wherein the substituted organic radical X includes 13 carbon atoms arranged as follows:

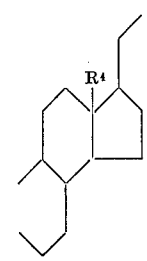

and $R^4$ is hydrogen or (lower)alkyl. Examples are pregna-1,4-dienes (R and $R^4$ are methyl) and 17-ethyl-10-methyl-gona-1,4-dienes (R is methyl, $R^4$ is hydrogen).

Particularly preferred steroids of this latter class are those of Formula Ia:

(Ia)
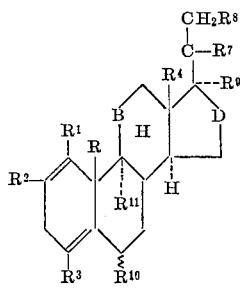

wherein R is (lower) alkyl, $R^1$, $R^2$ and $R^3$ are hydrogen or (lower)alkyl; $R^4$ is hydrogen or (lower) alkyl, particularly methyl; B is a divalent linkage selected from $CH_2$

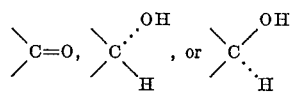

D is a divalent linkage selected from

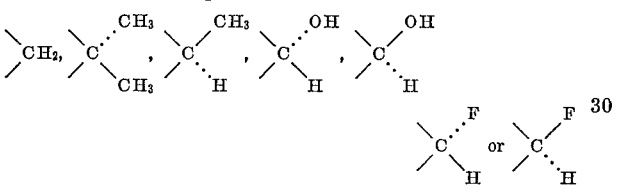

$R^7$ is oxo(keto), H(OH) or H($OR^{12}$), $R^{12}$ being a hydrocarbon acyl group of up to 18 carbon atoms; $R^8$ and $R^9$, independently, are hydrogen, hydroxyl or a hydrocarbon carboxylic acyloxy group of up to 18 carbon atoms; $R^{10}$ is hydrogen or (lower) alkyl, especially methyl; $R^{11}$ is hydrogen or fluorine; and 20-(lower alkylene), preferably ethylene, ketal derivatives of said compounds wherein $R^7$ is keto, 17α,21-(lower)alkylenedioxy, preferably isopropylidenedioxy, derivatives of said compounds wherein $R^8$ and $R^9$ are hydroxy, and 17α,20;20,21-bis[lower(alkylenedioxy)], preferably methylene dioxy, derivatives of said compounds wherein $R^8$ and $R^9$ are hydroxy and $R^7$ is oxo. These preferred steroids wherein $R^8$ represents hydrogen are powerful progestational agents with oral activity. In addition they have anti-androgenic, anti-gonadotrophic or anti-estrogenic properties or are useful in fertility control. Furthermore, they may be used in the treatment of premenstrual tension. When applied topically, or administered orally the compounds are useful in the treatment of acne.

The compounds of this embodiment wherein $R^8$ is not hydrogen and B represents a β-hydroxymethylene group are valuable cortical hormones with anti-inflammatory, low catabolic, glycogenic and thmolytic activities. In addition, they are anti-androgenic, anti-gonadotrophic or anti-estrogenic hormones. Furthermore, they have activity, including topical activity, in skin disorders such as psoriasis, allergic dermatitis and the like.

Illustrative are pregna-1,4-dienes and more particularly,

17α-20;20,21-bis-(methylenedioxy)-11-hydroxypregna-1,4-diene;
11,17α-21-trihydroxypregna-1,4-dien-20-one;
21-hydroxypregna-1,4-dien-20-one, 20-ethylene ketal;
21-hydroxypregna-1,4-dien-20-one;
17α-21-dihydroxypregna-1,4-dien-20-one, 20-ethylene ketal;
17α-21-dihydroxypregna-1,4-dien-20-one;
20ξ-hydroxypregna-1,4-diene;
pregna-1,4-dien-20-one;
9α-fluoro-16α-methyl-17α,20;20,21-bis-(methylenedioxy)-11β-hydroxypregna-1,4-diene;

9α-fluoro-16α-methyl-11β,17α,21-trihydroxypregna-1,4-dien-20-one;
9α-fluoro-11β,16α,17α,21-tetrahydroxypregna-1,4-dien-20-one;
6α-methyl-11β,17α,21-trihydroxypregna-1,4-dien-20-one;
2,6α-dimethyl-11β,17α-21-trihydroxypregna-1,4-dien-20-one;
9α-fluoro-6α-methyl-11β,17α-21-trihydroxypregna-1,4-dien-20-one;
9α-fluoro-11β,17α-21-trihydroxypregna-1,4-dien-20-one;
9α-fluoro-11β-hydroxy-17α,20;20,21-bis(methylenedioxy)-pregna-1,4-diene, and the like. Special mention is made of 17α,20;20,21-bis(methylenedioxy) - pregna - 1,4 - dien - 11β - ol; 17α,20; 20,21 - bis(methylenedioxy) - 9α - fluoro - 16α - methylpregna - 1,4 - dien - 11β - ol and 17α,20,20,21 - bis(methylenedioxy)9α - fluoro - pregna - 1,4 - dien - 11β - ol, which are highly potent anti-inflammatory agents.

DESCRIPTION OF THE INVENTION

The instant invention contemplates a process for the preparation of compounds of Formula I hereinabove, which process comprises, if required, protecting sensitive groups in other portions of the molecule, selectively hydrogenolyzing a 3-di(lower)alkylmercaptole 1,4 - diene steroid of Formula II:

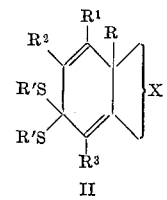

wherein R, $R^1$, $R^2$, $R^3$ and X are as above defined for Formula I and R' is (lower)alkyl, preferably methyl, until conversion of the 3-di(lower)alkylmercaptole group to a methylene group is substantially complete; if required, regenerating the protected sensitive groups; and recovering said 1,4-diene having an unsubstituted 3-position; then, if required, oxidizing, reducing, alkylating, esterifying or hydrolyzing the compound thus formed.

Of course, as will be well understood by those skilled in the art, the term "selectively hydrogenolyzing" means replacing the 3-di(lower)alkylmercaptole group with a 3-methylene group without irreversibly degrading the rest of the steroid molecule. Many means are known to accomplish this including protecting sensitive groups in other portions of the molecule and regenerating them by subsequent operations. For example, the 17-ketol group in corticosteroids is protected by forming a diethylene ketal or the like; a 17,20;20,21-bismethylenedioxy group; or a 17,21-diacetal with subsequent reduction of the carbonyl function. After having protected the dihydroxyacetone side chain, the 3- di(lower)alkylmercaptole function is hydrogenolyzed with Raney nickel or an alkali metal or an alkaline earth metal in a liquid amine, or an obvious chemical equivalent thereof, according to the instant process, and the pregna-1,4-diene is obtained. The protected 17-dihydroxy-acetone group is regenerated by treatment with acid for instance as will be fully described hereinafter. If a 17,21-acetal is used as a protecting group, the 20-alcohol is reoxidised, with chromic oxide, e.g. in pyridine or an obvious chemical equivalent thereof, before removal of the acetal with acid. Furthermore, if the substituent in the 5-membered D ring constitutes or comprises only a 17- or a 20 ketone group, the ketone group can be protected by a conversion to an ethylene ketal or it can be reduced prior to the cleavage reaction and subsequently oxidised with $CrO_3$ or an obvious chemical equivalent thereof. A acyloxy group will undergo conversion during hydrogenolysis, especially with an alkali metal or an alkaline earth metal in a liquid amine, to a hydroxy group but it may, if required, be re-esterified. The procedures will be fully exemplified hereinafter.

As mentioned, also contemplated by the instant invention are embodiments comprising the novel selective hydrogenolysis of a 3-di(lower)alkylmercaptole group including subsequent, optional, steps of oxidising, reducing, alkylating, esterifying, and hydrolysing functional groups in radiacl X. For example it is contemplated to convert a hydroxymethylene group to a keto group by use of chromic acid or an Oppenauer reagent, such as aluminum isopropoxide. Where there is a carbonyl group in X which it is desired to convert to a hydroxymethylene group, this is done with a carbonyl reducing agent, for example a borohydride to reduce a 17-keto, a 20-keto or an 11-keto group. Where it is desired to convert an alkylenedioxymethylene group or a bis-methylenedioxy group, and the like to corresponding carbonyl-containing groups, the latter are obtained by hydrolysis under the acid conditions necessary to remove the ketal groups. Where it is desired to convert a hydroxymethylene or a hydroxy (alkyl-substituted)methylene group to corresponding acyloxymethylene groups, the latter are obtained by esterification with an acylating agent. Esterification can be carried out by any suitable acylating agent, for instance an acid anhydride, acyl halide, or an obvious chemical equivalent thereof. If it is desired to convert a keto group to an hydroxy ("alkyl"-substituted) methylene group ("alkyl" in this sense including saturated (lower) alkyl, (lower)alkenyl, (lower)alkynyl or chloro (lower)alkynyl), the compound with former group is treated with an "alkyl" magnesium halide or an "alkyl" lithium compound; in all cases the reagents are preferably brought together in a suitable solvent medium and heat is applied as necessary.

The present invention particularly contemplates the preparation of a 1,4-diene compound of Formula I by a process which comprises selectively hydrogenolyzing the 3-di(lower)alkyl mercaptole group in a 1,4-diene of Formula II with Raney nickel catalyst preferably in the presence of a solvent such as a (lower)alkanol, e.g., ethanol, methanol, and the like, or an aromatic hydrocarbon solvent such as benzene, xylene and the like and preferably at a temperature corresponding to the reflux temperature of the mixture. Raney nickel, also known as Raney catalyst, is a well known and useful form of nickel metal. It is a highly-active, finely-divided nickel catalyst, prepared by dissolving the aluminum out of an alloy comprising Ni 30, Al 70, with alkali. The preparation and use of Raney nickel is described in the reference collected by E. Petit and E. V. Tamelin, in Organic Retactions, volume 12, John Wiley and Sons, Inc., New York, p. 356, 1962.

According to one manner of carrying out this embodiment the 3-diloweralkylmercaptole 1,4-diene steroid of Formula II is dissolved or suspended in about 50 parts by weight of an organic solvent, such as methanol, about 10 parts by weight of Raney nickel per part by weight of the steroid is added and the mixture is refluxed until conversion of the 3-di(lower)alkylmercaptole group to a 3-methylene group is substantially complete. It is found that 5 hours of refluxing is suitable in most instances although shorter or even longer times can be used. The product of Formula I is recovered by any conventional manner. For example, the mixture can be cooled to about 20° C., the catalyst removed by filtration and washed with an organic solvent. The combined filtrate and washings can be evaporated to leave the product as a residue. If desired, the residue can be further purified by re-crystallization or by chromatography on an appropriate adsorbent, such as silica gel and elution with a solvent, such as a mixture of benzene and ethyl acetate. These techniques will be exemplified in detail hereinafter.

This invention also contemplates among its specific embodiments the preparation of a 1,4-diene compound of Formula I by a process which comprises selectively hydrogenolyzing the 3-di(lower)alkylmarcaptole group in a 1,4-diene of Formula II with a catalyst comprising an alkali metal or an alkaline earth metal in a liquid amine, preferably in the presence of an alkanol. Suitably, and preferably, the alkali metal is lithium and the liquid amine is ammonia. However, especially useful catalysts also include the alkali metals, other than lithium, or alkaline earth metals, especially calcium, and the especially useful liquid amines are ammonia or low molecular weight amines, preferably ethylamine.

According to one manner of carrying out this embodiment, the 3-di(lower)alkylmercaptole 1,4-diene steroid of Formula II is dissolved or suspended in about 100 parts by weight of the liquid amine, to which preferably about 20 parts by weight, based on the steroid, of a solvent such as tetrahydrofuran has been added. The alkali metal or alkaline earth metal, such as lithium or calcium, is added piecemeal until an excess is present—if lithium is used, a blue color will persist. The reaction mixture is kept until formation of a 3-methylene group (product Formula I) is complete; thirty minutes is usually ample. The product can be recovered in any convenient way. One useful means is to add cautiously ammonium chloride, then hot water, to decompose the unreacted metal and to drive off the amine. The mixture can then be extracted with a solvent such as chloroform; evaporation of the solvent leaves the product as a residue. It can be purified, if desired, by recrystallization from a solvent, such as methanol, or by chromatography in a known manner, such as on a silica gel adsorbent, eluting with a solvent mixture, such as a mixture of benzene and ethyl acetate.

Starting materials, the 3-di(lower)alkylmercaptoles of 1,4-diene steroids (Formula II) are prepared according to techniques disclosed for example, in detail in D. E. Ayer, U.S. 3,261,854, or are readily derivable therefrom. In essence, a solution of a $\Delta^{1,4}$-3-oxosteroid in a dialkylformamide is cooled to about 0° C., and iodine and an alkane thiol added. The mixture is allowed to stand for about 3 to 5 days at a temperature of about 25° C. Higher temperatures will cause the reaction to be completed faster, but the use of a sealed reaction system then is required. After the reaction is complete, compounds of Formula II can be recovered by diluting the reaction mixture with ice water and filtering the precipitate. They can be purified by recrystallization if desired. The $\Delta^{1,4}$-3-oxosteroids used to make the compounds of Formula II are readily available by well-known synthetic pathways. In addition to the sources cited in the above-mentioned Ayer patent, $\Delta^{1,4}$-3-oxosteroids can be prepared from the $\Delta^{4}$-3-oxosteroids shown, for example, in G. V. Baddeley, H. Carpio and J. A. Edwards, J. Orig. Chem., 31, 1026 (1967); and in U.S. patent application Ser. No. 626,953, filed Mar. 30, 1967, by introducing a double bond in the 1,2-position according to conventional procedures, such as by treatment with dichloro-dicyanoquinone, selenium dioxide or by microbial fermentation. Other useful $\Delta^{1,4}$-3-oxosteroids are described by W. S. Allen, H. M. Kissman, S. Maner, I. Ringler and M. J. Weiss, J. Med. Pharm. Chem., 5, 133 (1962) and by Boylor and Sarett in U.S. 2,888,457.

It will be apparent from the disclosure herein to those skilled in the art that for the purposes of this invention, certain of the atoms of the 3-di(lower)alkylmercaptole 1,4-diene steroidal starting materials can be substituted with groups which do not interfere with the subsequent reactions. Thus included within the scope of this invention are androsta-1,4-dienes, pregna-1,4-dienes, 10-alkylgona-1,4-dienes and cholesta-1,4-diene derivatives.

When the starting compounds are substituted as hereinbefore designated, it will be apparent herefrom to those skilled in the art of chemistry that the final product formed in the processes of the invention will bear correspondingly the same or related substituents. Thus, for the processes of the invention and for the product of the invention produced thereby, such groups are the full equivalents of the invention as particularly claimed.

When the steroidal 1,4-dienes prepared by the process of this invention are employed as hormonal agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the therapeutic agents prepared by the instant process will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 400 mg. per day, although as aforementioned variations will occur. However, a dosage level that is in the range of from about 0.5 mg. to about 100 mg. per day is most desirably employed in order to achieve effective results.

DESCRIPTION OF THE PREFERRED EMBODIMENT

The following examples illustrate the best mode contemplated of using the claimed processes of the invention and of the manner of making the claimed products of the invention.

Example 1

17α,21-dihydroxypregna-1,4-dien-20-one.—17α,21 - dihydroxy-1,4-pregnadien-3,20-dione, 3-dimethylmercaptole, prepared as in the procedure of Example 9 of U.S. Patent 3,261,854, 0.5 g., is dissolved in 30 ml. of ethanol and refluxed for 5 hours with 5.0 g. of Raney nickel catalyst [Organic Syntheses, vol. 21, John Wiley and Sons, Inc., New York, p. 15 (1941)]. The mixture is cooled to about 25° C., the Raney nickel is removed by filtration and washed thoroughly with ethanol. The filtrate is combined with the washings and evaporated to dryness in a vacuum leaving the product as a residue. The residue is chromatographed on silica gel and eluted with a mixture of benzene and ethyl acetate. Recrylstallization of the material from methanol provides crystals of product, M.P. 112–120° C.

Example 2

17β - hydroxyandrosta - 1,4 - dien - diene.—17β - hydroxyandrosta-1,4-dien-3-one, 3-dimethylmercaptole, 0.5 g., is selectively catalytically hydrogenolyzed by the procedure of Example 1 and the product, M.P., 130–132.5° C., is obtained.

Example 3

Androsta - 1,4 - dien - 17 - one, 17 - ethylene ketal.—Androsta-1,4-dien-17-one, 17-ethylene ketal, 3-dimethylmercaptole, 0.5 g., is selectively catalytically hydrogenolyzed by the procedure of Example 1 and the product is recovered as an oil. The infrared spectrum conforms to the expected structure.

The androsta-1,4-dien-17-one, 17-ethylene ketal, 1.5 g., is dissolved in 25 ml. of methanol and stirred for 3 hours at room temperature with 2.5 ml. of a mixture of conc. HCl (37.5 ml.) and water (12.5 ml.). A slight excess of saturated NaHCO$_3$ solution and water is then added and the product extracted into CHCl$_3$. The chloroform solution is washed with water, dried over Na$_2$SO$_4$ and the solvent is removed in vacuo to give the androsta-1,4-dien-17-one as an oily solid, 1.0 g. $\lambda_{max.}^{CHCl_3}$ 3.44, 3.48, 3.52, 5.75μ.

Example 4

Androsta - 1,4 - dien - 17 - one.—Androsta - 1,4 - diene-3,17-dione, 3-dimethylmercaptole, 0.5 g., is selectively catalytically hydrogenolyzed by the procedure of Example 1 and the product, with properties described in Example 3, is obtained.

Example 5

17α - ethynyl - 17β - hydroxyandrosta - 1,4 - diene.—17α - ethynyl - 17β - hydroxyandrosta - 1,4 - diene - 3-one, 3-dimethylmercaptole, 0.5 g., is selectively catalytically hydrogenolyzed by the procedure of Example 1 and the product, M.P., 85–96° C., is obtained.

Example 6

17α - chloroethynyl - 17β - hydroxyandrosta - 1,4-diene.—17α - chloroethynyl - 17β - hydroxyandrosta - 1,4-dien-3-one, 3-dimethylmercaptole, 0.5 g., is selectively catalytically hydrogenolyzed by the procedure of Example 1 and the product is obtained.

Example 7

17α,20;20,21 - bis(methylenedioxy) - 11β - hydroxypregna - 1,4 - diene.—17α,20;20,21 - bis(methylenedioxy)-11β-hydroxypregna-1,4-dien-3-one, 3 - dimethylmercaptole, 0.5 g., is selectively catalytically hydrogenolyzed by the procedure of Example 1 and the product, M.P., 186–188° C., is obtained.

Example 8

11β,17α,21 - trihydroxypregna - 1,4 - dien - 20 - one.—11β,17α,21 - trihydroxypregna - 1,4 - dien - 3,20 - dione, 3-dimethylmercaptole, 0.5 g., prepared as in Example 9 of U.S. 3,261,854 is selectively catalytically hydrogenolyzed by the procedure of Example 1 and the product, M.P., 108–116° C., is obtained.

Example 9

21 - hydroxypregna - 1,4 - dien - 20 - one, 20 - ethylene ketal.—21 - hydroxypregna - 1,4 - diene - 3,20 - dione, 20-ethylene ketal, 3-dimethylmercaptole, 0.5 g., is selectively catalytically hydrogenloyzed by the procedure of Example 1 and the product, M.P., 115–117° C., is obtained.

Example 10

21 - hydroxypregna - 1,4 - dien - 20 - one.—21 - hydroxypregna-1,4-diene-3,20-dione, 3 - dimethylmercaptole, 0.5 g., is selectively catalytically hydrogenolyzed by the procedure of Example 1 and the product, M.P., 113–119° C., is obtained.

Example 11

17α,21 - dihydroxypregna - 1,4 - dien - 20 - one, 20-ethylene ketal.—17α,21 - dihydroxypregna - 1,4 - diene-3,20-diene, 20-ethylene ketal, 3-dimethylmercaptole, 0.5 g., is selectively catalytically hydrogenolyzed by the procedure of Example 1 and the product, M.P., 128–160° C., is obtained.

Example 12

17α,21 - dihydroxypregna - 1,4 - dien - 20 - one.—

17α,21 - dihydroxypregna - 1,4 - diene - 3,20 - dione, 3-dimethylmercaptole, 0.5 g., is selectively catalytically hydrogenolyzed by the procedure of Example 1 and the prdouct, M.P., 112–120° C., is obtained.

Example 13

20ξ - hydroxypregna - 1,4 - diene.—20ξ - hydroxypregna-1,4-dien-3-one, 3-dimethylmercaptole, is selectively catalytically hydrogenolyzed by the procedure of Example 1 and the product, M.P., 138–141° C., is obtained.

Example 14

Pregna - 1,4 - dien - 20 - one.—Pregna - 1,4 - diene-3,20-dione, 3-dimethylmercaptole, 0.5 g., is selectively catalytically hydrogenolyzed by the procedure of Example 1 and the product, M.P., 131–137° C., is obtained.

Example 15

9α - fluoro - 16α - methyl - 11β,17α,21 - trihydroxypregna - 1,4 - dien - 20 - one.—9α - fluoro - 16α - methyl - 11β,17α,21-trihydroxypregna-1,4-diene-3,20-dione, 3-dimethylmercaptole, 0.5 g., is selectively catalytically hydrogenolyzed by the procedure of Example 1 and the product is obtained.

Example 16

9α - fluoro - 11β - hydroxy-17α,20;20,21-bis(methylenedioxy)-pregna - 1,4 - diene.—9α - fluoro - 11β - hydroxy-17α,20;20,21-bis(methylenedioxy)-pregna - 1,4 - dien-3-one, 3-dimethylmercaptole, 0.5 g., is selectively catalytically hydrogenolyzed by the procedure of Example 1 and the product, M.P., 168–174° C., is obtained.

Example 17

9α - fluoro - 11β,16α,17α,21 - tetrahydroxy-pregna-1,4-dien-20-one.—9α - fluoro - 11β,16α,17α,21 - tetrahydroxypregna-1,4-diene-3,20-dione, 3-dimethylmercaptole, 0.5 g., is selectively catalytically hydrogenolyzed by the procedure of Example 1 and the product is obtained.

Example 18

6α - methyl - 11β,17α,21 - trihydroxypregna - 1,4 - dien-20-one.—6α - methyl - 11β,17α,21 - trihydroxypregna-1,4-diene-3,20-dione, 3-dimethylmercaptole, 0.5 g., prepared as in Example 9 of U.S. 3,261,854, is selectively catalytically hydrogenolyzed by the procedure of Example 1 and the product is obtained.

Example 19

2,6α - dimethyl - 11β,17α,21 - trihydroxypregna - 1,4-dien-20-one.—2,6α - dimethyl - 11β,17α,21 - trihydroxypregna-1,4-diene-3,20-dione, 3-dimethylmercaptole, 0.5 g., is selectively catalytically hydrogenolyzed by the procedure of Example 1 and the product is obtained.

Example 20

9α - fluoro - 6α - methyl - 11β,17α,21 - trihydroxypregna - 1,4 - dien - 20 - one.—9α - fluoro - 6α - methyl-11β,17α,21-trihydroxypregna - 1,4 - diene-3,20-dione, 3-dimethylmercaptole, 0.5 g., prepared as in Example 9 of U.S. 3,261,854, is selectively catalytically hydrogenolyzed by the procedure of Example 1 and the product is obtained.

Example 21

9α - fluoro - 11β,17α,21 - trihydroxypregna - 1,4 - dien-20-one.—9α - fluoro - 11β,17α,21 - trihydroxypregna-1,4-diene-3,20-dione, 3-dimethylmercaptole, 0.5 g., selectively catalytically hydrogenolyzed by the procedure of Example 1 and the product is obtained.

Example 22

17α,21 - dihydroxypregna - 1,4 - diene - 11,20 - dione.—17α,21 - dihydroxypregna - 1,4 - diene - 3,11,20 - trione, 3-dimethylmercaptole is selectively catalytically hydrogenolyzed by the procedure of Example 1 and the product is obtained.

Example 23

The procedure of Example 1 is used to selectively catalytically hydrogenolyze 0.5 g. each of the following 3-di(lower)alkylmercaptole 1,4-diene steroids:

17β-hydroxy-17α-methylandrosta-1,4-dien-3-one, 3-dimethylmercaptole;
13β-ethyl-17α,21-dihydroxygona-1,4-diene-3,20-dione, 3-dimethylmercaptole;
11β,17β-dihydroxy-17α-methylandrosta-1,4-dien-3-one, 3-di-n-pentylmercaptole;
17α,21-dihydroxy-10-ethyl-13-methylgona-1,4-diene-3,20-dione, 3-dimethylmercaptole;
17α,21-dihydroxy-1-methylpregna-1,4-diene-3,20-dione, 3-dimethylmercaptole;
17α,21-dihydroxy-4-methylpregna-1,4-diene-3,20-dione, 3-dimethylmercaptole; and
17α,21-dihydroxy-10-methyl-13β-n-pentylgona-1,4-diene-3,20-dione, 3-dimethylmercaptole.

There are obtained:

17β-hydroxy-17α-methylandrosta-1,4-diene;
13β-ethyl-17α,21-dihydroxygona-1,4-dien-20-one;
11β,17β-dihydroxy-17α-methylandrosta-1,4-diene;
17α,21-dihydroxy-10-ethyl-13-methylgona-1,4-dien-20-one;
17α,21-dihydroxy-1-methylpregna-1,4-dien-20-one;
17α,21-dihydroxy-4-methylpregna-1,4-diene-20-one; and
17α,21-dihydroxy-10-methyl-13β-n-pentylgona-1,4-dien-20-one.

Example 24

17β - hydroxy - 17α - methylandrosta - 1,4 - diene.—17β - hydroxy - 17α - methylandrosta - 1,4 - dien - 3 - one, 3-dimethylmercaptole, 0.5 g., is dissolved in 50 ml. of liquid ammonia and 10 ml. of tetrahydrofuran. Lithium metal is added piecemeal until a blue color persists and the mixture is stirred for 30 minutes more. The mixture then is decomposed with the cautious addition of ammonium chloride followed by hot water. Extraction of the mixture with chloroform, concentrating the extract and chromatographing the residue on silica gel provides the product. Recrystallization from hexane provides crystals, M.P., 70–80° C.

The reaction is repeated substituting liquid ethylamine for ammonia. Substantially the same results are obtained.

The reaction is repeated substituting calcium for the lithium. Substantially the same results are obtained.

Example 25

The procedure of Example 24 is used to selectively hydrogenolyze 0.5 g. each of the following 3-di(lower)-alkylmercaptole steroids:

17β-hydroxyandrosta-1,4-dien-3-one, 3-dimethylmercaptole;
androsta-1,4-diene-3,17-dione, 17-ethylene ketal, 3-dimethylmercaptole;
17α,20;20,21-bis(methylenedioxy)-11β-hydroxypregna-1,4-dien-3-one, 3-dimethylmercaptole;
17β-hydroxypregna-1,4-dien-3,20-dione, 20-ethylene ketal, 3-dimethylmercaptole;
17α,21-dihydroxypregna-1,4-diene-3,20-dione, 20-ethylene ketal, 3-dimethylmercaptole;
20ξ-hydroxypregna-1,4-dien-3-one, dimethylmercaptole;
9α-fluoro-11β-hydroxy-17α,20;20,21-bis(methylenedioxy)-pregna-1,4-dien-3-one, 3-dimethylmercaptole; and
11β,17β-dihydroxy-17α-methylandrosta-1,4-dien-3-one, 3-di-n-pentylmercaptole.

There are obtained:
17α-hydroxyandrosta-1,4-diene;
androsta-1,4-dien-17-one, 17-ethylene ketal;
17α,20;20,21 - bis(methylenedioxy) - 11β - hydroxypregna-1,4-diene;

17β - hydroxypregna - 1,4 - dien - 20 - one, 20 - ethylene ketal;
17α,21 - dihydroxypregna - 1,4 - dien - 20 - one, 20 - ethylene ketal;
20ξ-hydroxypregna-1,4-diene;
9α - fluoro - 11β - hydroxy - 17α,20;20,21 - bis(methylenedioxy)-pregna-1,4-diene; and
11β,17β-dihydroxy-17α-methylandrosta-1,4-diene.

We claim:
1. A process for the preparation of a 1,4-diene steroid having an unsubstituted 3-position of the formula:

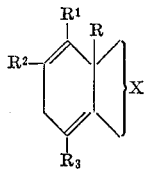

wherein R is lower alkyl; $R^1$, $R^2$ and $R^3$ are hydrogen or lower alkyl; and X is an organic radical of at least 11 carbon atoms so arranged as to complete a cyclopentanoperhydrophenanthrene nucleus; which comprises selectively hydrogenolyzing a 3-di(lower)alkylmercaptole 1,4-diene steroid of the formula:

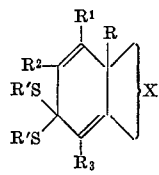

wherein R, $R^1$, $R^2$, $R^3$ and X are as above defined and R' is (lower) alkyl, in the presence of an alkali metal or an alkaline earth metal in a liquid amine until conversion of the 3-di(lower)alkylmercaptole group to a methylene group is substantially complete; and recovering said 1,4-diene having an unsubstituted 3-position.

2. A process as defined in claim 1, wherein R and R' are methyl and $R^1$ and $R^2$ and $R^3$ are hydrogen.

3. A process as defined in claim 1 wherein the alkali metal is lithium and the liquid amine is amonia.

4. A process as defined in claim 3 wherein 17β-hydroxy-17α-methylandrosta-1,4-diene is prepared by selectively hydrogenolyzing 17β-hydroxy-17α-methylandrosta-1,4-dien-3-one, 3-dimethylmercaptole.

5. A process as defined in claim 1 wherein 17β-hydroxyandrosta-1,4-diene is prepared by selectively hydrogenolyzing 17β-hydroxyandrosta-1,4-diene-3-one, 3-dimethylmercaptole.

6. A process as defined in claim 1 wherein androsta-1,4-dien-17-one, 17-ethylene ketal is prepared by selectively hydrogenolyzing androsta-1,4-diene-3,17-dione, 17-ethylene ketal, 3-dimethylmercaptole.

7. A process as defined in claim 1 wherein 17α,20;20,21-bis(methylenedioxy)-11β-hydroxypregna-1,4-diene is prepared by selectively hydrogenolyzing 17α,20;20,21-bis-(methylenedioxy) - 11β - hydroxypregna - 1,4 - dien - 3-one, 3-dimethylmercaptole.

8. A process as defined in claim 1 wherein 17α,21-dihydroxypregna-1,4-dien-20-one, 20-ethylene ketal is prepared by selectively hydrogenolyzing 17α,21-dihydroxypregna-1,4-diene-3,20-dione, 20-ethylene ketal, 3-dimethylmercaptole.

9. A process as defined in claim 1 wherein 20ξ-hydroxypregna-1,4-diene is prepared by selectively hydrogenolyzing 20ξ-hydroxypregna-1,4-dien-3-one, 3-dimethylmercaptole.

10. A process as defined in claim 1 wherein 9α-fluoro-11β - hydroxy - 17α,20;20,21 - bis(methylenedioxy)pregna-1,4-diene is prepared by selectively hydrogenolyzing 9α - fluoro - 11β - hydroxy - 17α,20;20,21 - bis(methylenedioxy)pregna-1,4-dien-3-one, 3-dimethylmercaptole.

References Cited
UNITED STATES PATENTS 3,395,161    7/1968    Shroff _____ 260—397.4
3,400,137    9/1968    Cross _____ 260—397.4

ELBERT L. ROBERTS, Primary Examiner

U.S. Cl. X.R.
260—397.3, 397.45, 397.47, 999, 397.5